US 6,570,635 B2

(12) United States Patent
Kikkawa

(10) Patent No.: US 6,570,635 B2
(45) Date of Patent: May 27, 2003

(54) METHOD OF MANUFACTURING LIQUID CRYSTAL DISPLAY DEVICE

(75) Inventor: Hironori Kikkawa, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 10/255,647

(22) Filed: Sep. 27, 2002

(65) Prior Publication Data

US 2003/0025870 A1 Feb. 6, 2003

Related U.S. Application Data

(62) Division of application No. 09/307,741, filed on May 10, 1999, now Pat. No. 6,647,894.

(30) Foreign Application Priority Data

May 13, 1998 (JP) .............................................. 10-129379

(51) Int. Cl.⁷ ............................................ G02F 1/1337
(52) U.S. Cl. ...................... 349/123; 349/122; 349/124; 349/129
(58) Field of Search ................................ 349/122, 123, 349/124, 129, 191, 85; 438/30; 430/20

(56) References Cited

U.S. PATENT DOCUMENTS

| | | | |
|---|---|---|---|
| 5,264,954 A | * 11/1993 | Okada | 349/85 |
| 5,438,421 A | 8/1995 | Sugawara et al. | |
| 5,552,911 A | * 9/1996 | Okada et al. | 349/106 |
| 5,808,717 A | 9/1998 | Van Aerle | |
| 5,831,704 A | * 11/1998 | Yamada et al. | 349/124 |
| 5,949,510 A | 9/1999 | Hsieh et al. | |
| 6,108,063 A | * 8/2000 | Yuuki et al. | 349/95 |
| 6,188,457 B1 | * 2/2001 | Liu | 349/124 |
| 6,407,790 B1 | * 6/2002 | Chen | 349/124 |

FOREIGN PATENT DOCUMENTS

| | | |
|---|---|---|
| JP | 57-064211 | 4/1982 |
| JP | 04-268532 | 9/1992 |
| JP | 05-053513 | 3/1993 |
| JP | 05-134244 | 5/1993 |
| JP | 05-264998 | 10/1993 |
| JP | 06-138485 | 5/1994 |
| JP | 07-159787 | 6/1995 |
| JP | 07-199193 | 8/1995 |
| JP | 07-311383 | 11/1995 |
| JP | 07-333612 | 12/1995 |
| JP | 08-334786 | 12/1996 |
| JP | 09-033896 | 2/1997 |
| JP | 09-033929 | 2/1997 |
| JP | 09-146095 | 6/1997 |

* cited by examiner

Primary Examiner—Robert H. Kim
Assistant Examiner—David Chung
(74) Attorney, Agent, or Firm—Foley & Lardner

(57) ABSTRACT

In a liquid crystal display device having a pixel substrate 1, a opposite substrate 2 and a liquid crystal layer 3 disposed between the pixel substrate 1 and the opposite substrate 2, the pixel substrate 1 has a transparent substrate 4, a pixel electrode 5 provided on the transparent substrate 4, an orientation control slope portion 6 which is provided on the pixel electrode 5, sloped in different directions within each pixel and formed of organic film such as acrylic resin, and an orientation layer 7 coated on the orientation control slope portion 6, and the opposite substrate 2 has a transparent substrate 8, a opposite electrode 9 provided on the transparent substrate 8 and an orientation layer 10 coated on the opposite electrode 9.

4 Claims, 18 Drawing Sheets

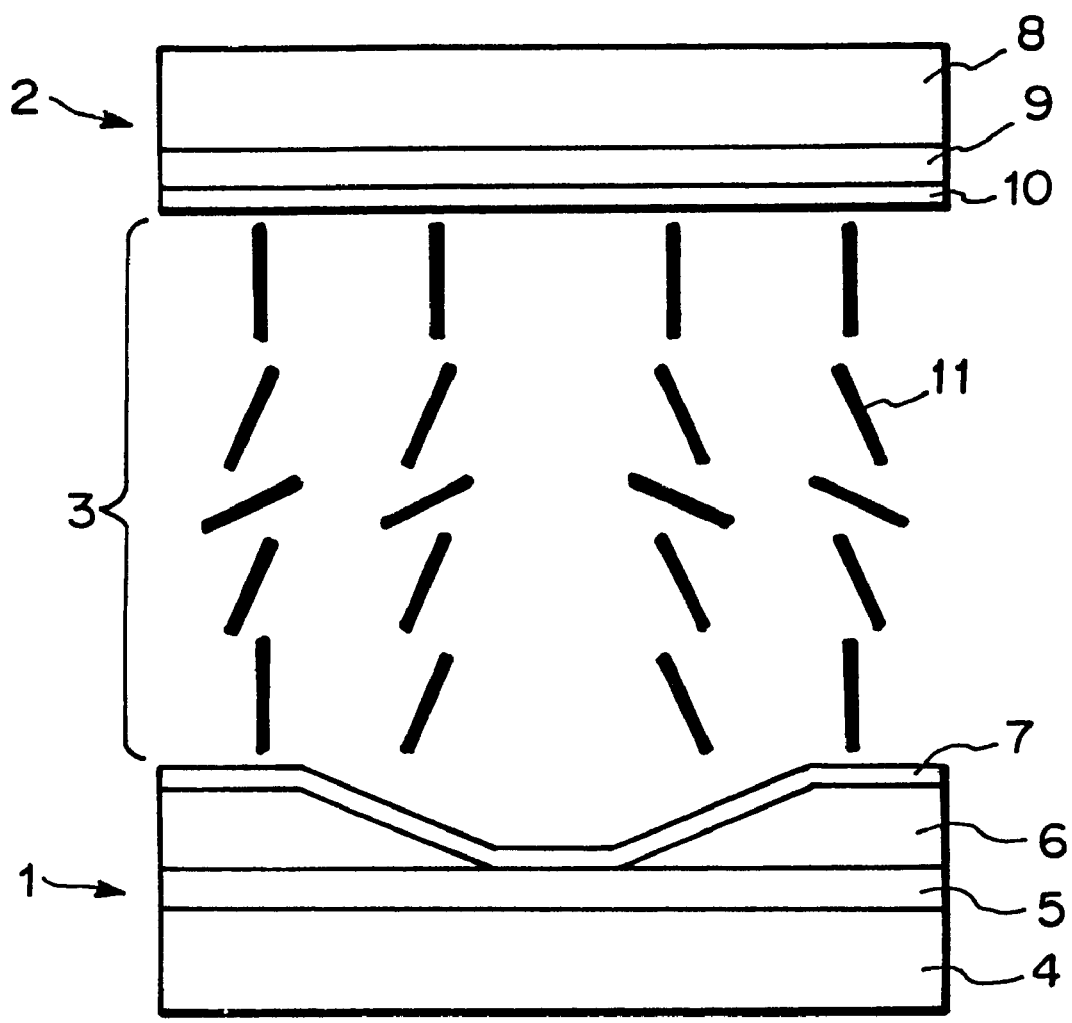

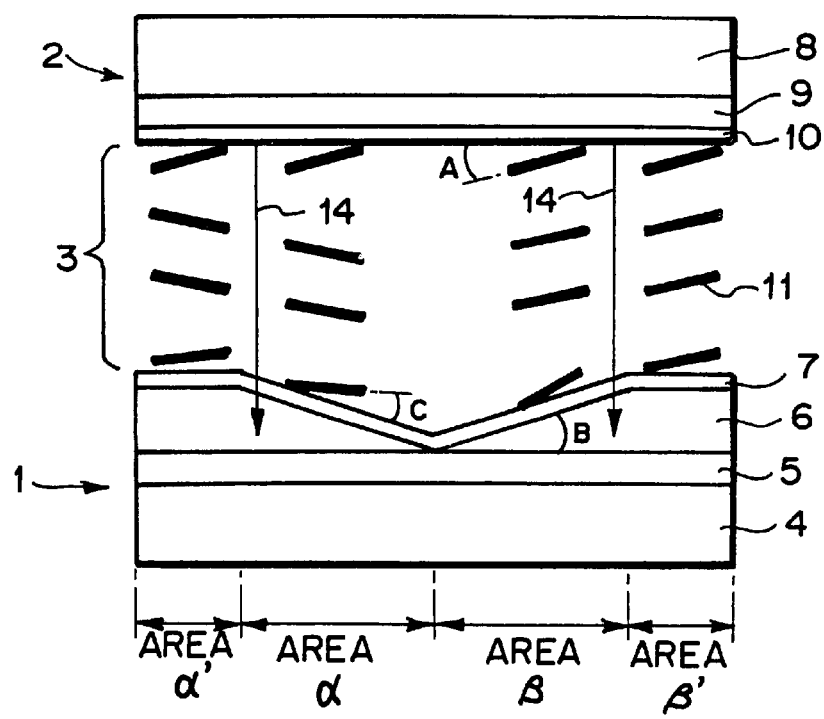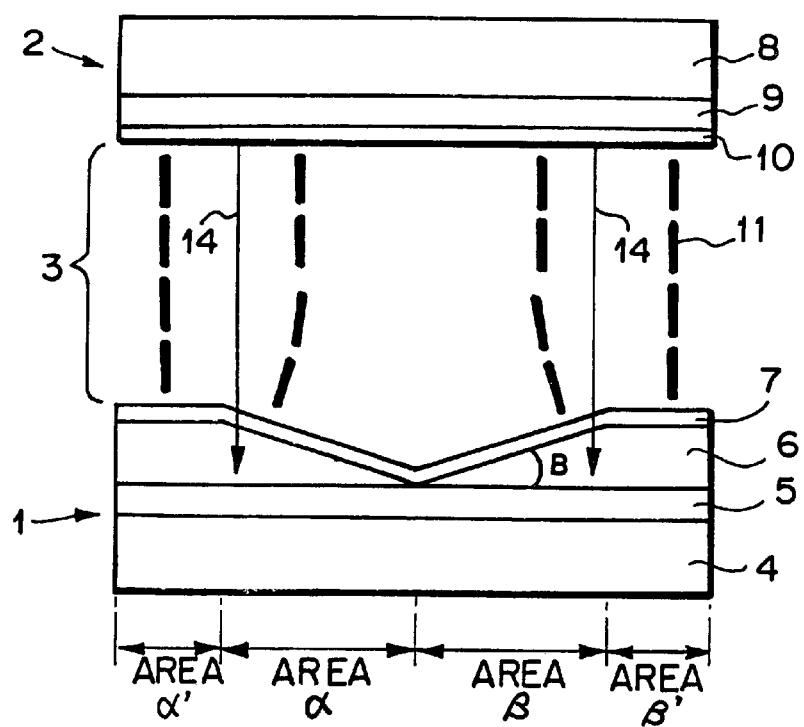

FIG. 18
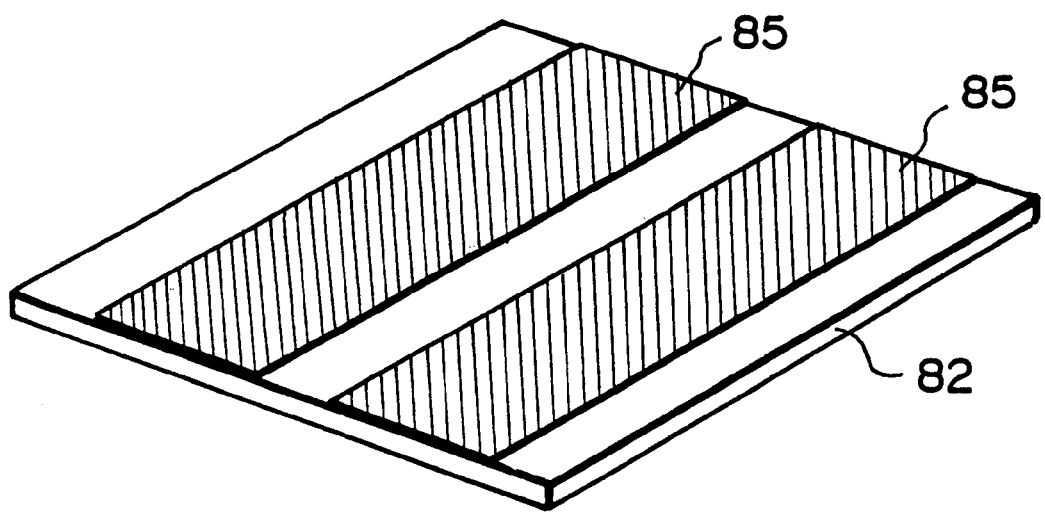
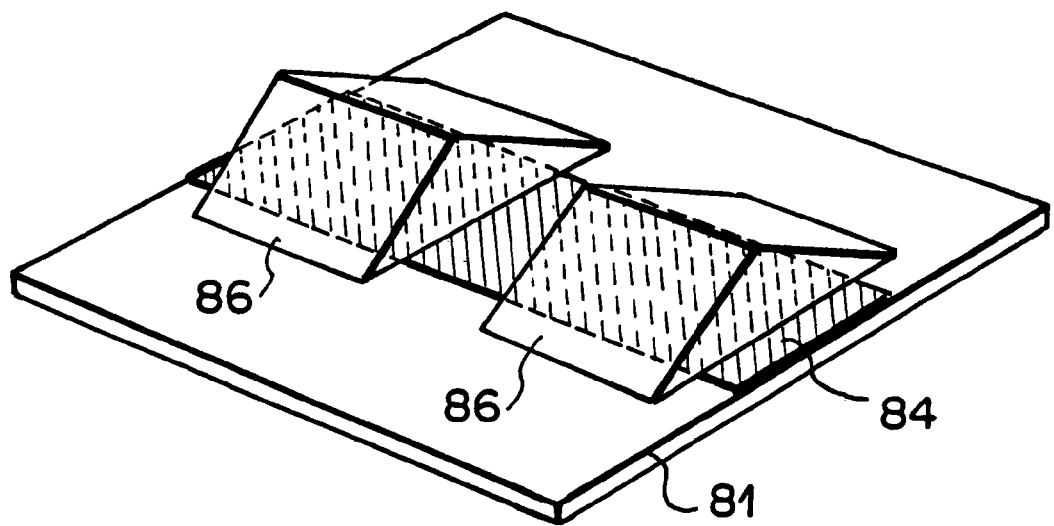

METHOD OF MANUFACTURING LIQUID CRYSTAL DISPLAY DEVICE

CROSS-REFERENCE TO RELATED PATENT APPLICATIONS

This application is a division of application Ser. No. 09/307,741, filed May 10, 1999 now U.S. Pat. No. 6,647,894, and related to a concurrently filed application, entitled: Liquid Crystal Display Device and based on Japanese Patent Application No. 10-129379, filed May 13, 1998, by Hironori KIKKAWA. This application claims only subject matter disclosed in the parent application and therefore presents no new matter.

BACKGROUND OF THE INVENTION

1. Field of the Invention

The present invention relates to a liquid crystal display device and a manufacturing method therefor and particularly to a liquid crystal display device having a wide range of viewing angle and a method of manufacturing the same.

2. Description of the Prior Art

In general, liquid crystal display devices have been used as display devices for various electronic equipment, etc. because they can be manufactured to be thin in thickness and light in weight. However, the liquid crystal display device has a disadvantage that the viewing angle thereof is narrower than CRT. Therefore, a technique for widening the viewing angle of the liquid crystal display device has been hitherto proposed.

FIG. 10 is a perspective view showing a conventional liquid crystal display device disclosed in Japanese Patent Laid-open Publication No. 7-199193. In the conventional liquid crystal display device, uneven surface 52 is provided at each pixel 51 on one substrate 56 or both substrates 56, 57. FIG. 10 shows a case where uneven surfaces 52 are provided on the substrate 56. Upon applying a voltage between the substrates 56 and 57, the rise-up direction of liquid crystal molecules 53 between the substrates 56 and 57 is determined by an angle which is dependent on the surface structure of the substrate 56, whereby areas 54 and 55 having different orientation directions are provided at the voltage application time and the visual characteristic is compensated between the respective areas 54 and 55. Therefore, a liquid crystal display device having a wide range of viewing angle can be obtained.

FIGS. 11A to 11D are cross-sectional views showing a series of steps of a method of manufacturing a substrate used for the above conventional liquid crystal display device.

First, thermoplastic resist 61 is coated on substrate 60 with electrodes (FIG. 11A).

Subsequently, the resist 61 is partially shielded and then exposed to light to dissolve and remove undesired portions of the resist, whereby resist 61a remains in a partial area (FIG. 11B).

Subsequently, the substrate 60 is heated to deform the resist 61a, thereby forming resist 61b having an uneven structure surface respectively (FIG. 11C).

However, the conventional liquid crystal display device described above has a disadvantage that it has lower transparency as compared with similar organic materials having no photosensitive group because a photosensitive resist is used even when the whole-surface light exposure is performed, so that a display image is darkened or colored.

Furthermore, it is described in the above publication that according to the method of manufacturing the substrate used in the above conventional liquid crystal display device, slant and uneven portions are formed in a wide range by deforming the thermoplastic resist. However, the thermoplastic resist is actually deformed at only the end portions of the residual resist like the resist 61c, and it is difficult to form the slant and uneven portions in a wide range (FIG. 11D). Accordingly, the conventional liquid crystal display device has a disadvantage that a regulation force is insufficient to keep the uniform rise-up direction and thus a stable orientation state cannot be obtained.

SUMMARY OF THE INVENTION

An object of the present invention is to provide a liquid crystal display device having a wide range of viewing angle characteristic with which transparency is enhanced and a stable orientation state can be obtained, and a method of manufacturing the liquid crystal display device.

In order to attain the above object, according to a first aspect of the present invention, a liquid crystal display device having a pair of substrates and a liquid crystal layer disposed therebetween, is characterized in that orientation control slope portions composed of an organic film are provided on at least one of the substrates so as to be slopewise formed in different directions within each pixel, and an opaque shielding electrode is disposed at a boundary portion at which the slope direction is varied in each of the orientation control slope portions.

According to a second aspect of the present invention, a liquid crystal display device having a first substrate, a second substrate and a liquid crystal layer disposed between the first substrate and the second substrate, is characterized in that the first substrate comprises a first transparent substrate, first transparent electrodes provided on the first transparent substrate, orientation control slope portions which are slopewise formed in different directions within each pixel and composed of organic film and provided on the first transparent electrodes and a first orientation layer coated on the orientation control slope portions, the second substrate comprises a second transparent substrate, one or more second transparent electrodes provided on the second transparent substrate and a second orientation layer coated on the one or more second transparent electrodes, and an opaque shielding electrode is disposed a boundary portion at which the slope direction is varied in each of the orientation control slope portions.

According to a third aspect of the present invention, a liquid crystal display device having a first substrate, a second substrate and a liquid crystal layer disposed between the first substrate and the second substrate, is characterized in that the first substrate comprises a first transparent substrate, pixel electrodes provided on the first transparent substrate, first orientation control slope portions which are slopewise formed in different directions within each pixel and composed of organic film and provided on the pixel electrodes, and a first orientation layer coated on the first orientation control slope portions, the second substrate comprises a second transparent substrate, one or more opposite electrodes provided on the second transparent substrate, a second orientation control slope portions which are slopewise formed in different directions within each pixel and composed of organic film and provided on the one or more opposite electrodes, and a second orientation layer coated on the second orientation control slope portions, the first and second orientation control slope portions being formed so that the confronting surfaces thereof are substantially parallel to each other, and an opaque shielding electrode is disposed at a boundary portion at which the slope direction is varied in each of the first orientation control slope portions.

According to a fourth aspect of the present invention, a liquid crystal display device having a first substrate, a second substrate and a liquid crystal layer disposed between the first substrate and the second substrate, is characterized in that the first substrate comprises a first transparent substrate, pixel electrodes provided on the first transparent substrate, first orientation control slope portions which are slopewise formed in different directions within each pixel and composed of organic film and provided on the pixel electrodes, and a first orientation layer coated on the first orientation control slope portions, the second substrate comprises a second transparent substrate, one or more opposite electrodes provided on the second transparent substrate, a second orientation control slope portions which are slopewise formed in different directions within each pixel and composed of organic film and provided on the one or more opposite electrodes, and a second orientation layer coated on the second orientation control slope portions, the first and second orientation control slope portions being formed so that the confronting surfaces thereof are substantially parallel to each other, and an opaque shielding electrode is disposed at a boundary portion at which the slope direction is varied in each of the second orientation control slope portions.

According to a fifth aspect of the present invention, a liquid crystal display device having a pair of substrates and a liquid crystal layer disposed therebetween, is characterized in that orientation control slope portions composed of an organic film are provided on at least one of the substrates so as to be slopewise formed in different directions within each pixel, the organic film being composed of organic material containing no photosensitive group.

According to a sixth aspect of the present invention, a liquid crystal display device having a first substrate, a second substrate and a liquid crystal layer disposed between the first substrate and the second substrate, is characterized in that the first substrate comprises a first transparent substrate, first transparent electrodes provided on the first transparent substrate, orientation control slope portions which are slopewise formed in different directions within each pixel and composed of organic film and provided on the first transparent electrodes and a first orientation layer coated on the orientation control slope portions, the second substrate comprises a second transparent substrate, one or more second transparent electrodes provided on the second transparent substrate and a second orientation layer coated on the one or more second transparent electrodes, the organic film being composed of organic material containing no photosensitive group.

According to a seventh aspect of the present invention, a liquid crystal display device having a first substrate, a second substrate and a liquid crystal layer disposed between the first substrate and the second substrate, is characterized in that the first substrate comprises a first transparent substrate, pixel electrodes provided on the first transparent substrate, first orientation control slope portions which are slopewise formed in different directions within each pixel and composed of organic film and provided on the pixel electrodes, and a first orientation layer coated on the first orientation control slope portions, the second substrate comprises a second transparent substrate, one or more opposite electrodes provided on the second transparent substrate, a second orientation control slope portions which are slopewise formed in different directions within each pixel and composed of organic film and provided on the one or more opposite electrodes, and a second orientation layer coated on the second orientation control slope portions, the first and second orientation control slope portions being formed so that the confronting surfaces thereof are substantially parallel to each other, the organic film being composed of organic material containing no photosensitive group.

The organic film constituting the orientation control slope portions is preferably composed of material selected from the group consisting of acrylic resin, polyimide, polysilazane, low-temperature curing type polysilazane and benzocyclobutene.

According to a eighth aspect of the present invention, a method of manufacturing a liquid crystal display device comprising the steps of:

(1) coating an organic material on one or more electrodes of at least one of a pair of substrates to form an organic film;

(2) coating photoresist on the organic film;

(3) exposing the photoresist to light;

(4) immersing the substrate in developing solution to perform development and subjecting the organic film to wet etching with the developing solution;

(5) exfoliating the photoresist;

(6) deforming the organic film by heating the organic film, and providing on the substrate orientation control slope portions which are sloping in different directions respectively and formed of organic film; and (7) coating an orientation film on the orientation control slope portion.

The developing solution is preferably an alkali developing solution, and the organic film is preferably composed of material that is dissolved in the alkali developing solution.

According to a ninth aspect of the present invention, a method of manufacturing a liquid crystal display device comprising the steps of:

(1) coating an organic material on one or more electrodes of at least one of a pair of substrates to form an organic film;

(2) coating photoresist on the organic film;

(3) exposing the photoresist to light;

(4) immersing the substrate in developing solution to perform development;

(5) wet-etching the organic film;

(6) exfoliating the photoresist;

(7) deforming the organic film by heating the organic film, and providing on the substrate orientation control slope portions which are sloping in different directions respectively and formed of organic film; and (8) coating an orientation film on the orientation control slope portions;

The developing solution is an alkali developing solution, and the organic film is composed of material which is not dissolved in the alkali developing solution.

According to the liquid crystal display device of the present invention, the orientation control slope portions are formed so as to be slopewise in the different directions within each pixel, and thus the orientation stability of domains is enhanced. Further, since the orientation control slope portion in each pixel is formed of the organic film, transparency is very excellent.

According to the manufacturing method of the present invention, since the organic film which can be formed at a large thickness is subjected to wet etching and then heated

BRIEF DESCRIPTION OF THE DRAWINGS

FIG. 3 is a cross-sectional view showing a liquid crystal display device according to a second embodiment of the present invention;

FIG. 8 is a diagram showing the operation of the liquid crystal display device according to the first embodiment of the present invention;

FIG. 9 is a diagram showing the operation of the liquid crystal display device according to the second embodiment of the present invention;

FIGS. 17, 18 are fragmentary exploded perspective views showing the pixel substrate and opposite substrate of the eighth embodiment.

DETAILED DESCRIPTION OF PREFERRED EMBODIMENTS

Preferred embodiments according to the present invention will be described hereunder with reference to the accompanying drawings.

Figure 1A:
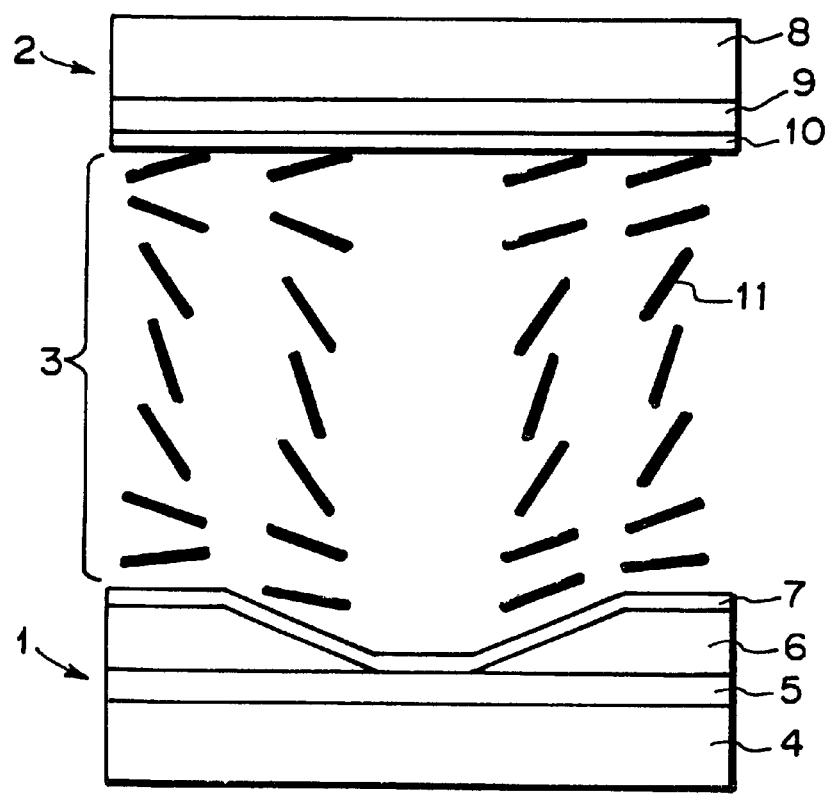
FIG. 1A is a cross-sectional view showing a pixel of a liquid crystal display device according to a first embodiment of the present invention.

FIG. 1A is a cross-sectional view showing a pixel of a liquid crystal display device according to a first embodiment of the present invention.

As shown in FIG. 1A, the liquid crystal display device according to the first embodiment includes pixel substrate 1, opposite substrate 2 and liquid crystal layer 3 disposed between the pixel substrate 1 and the opposite substrate 2.

The pixel substrate 1 includes first transparent insulating substrate 4 such as a glass substrate or the like, pixel electrodes 5 provided on the first transparent insulating substrate 4, orientation control slope portions 6 which are formed on the pixel electrodes 5 so as to be gently sloping in a recess form in different directions within each pixel and composed of an organic film, and orientation layer 7 coated on the orientation control slope portions 6. The organic film constituting the orientation control slope portions 6 is formed of acrylic resin, polyimide, polyimide, polysilazane, low-temperature curing type polysilazane or benzocyclobutene. The organic film is composed of organic material containing no photosensitive group (such as naphtho quinone diazide, cinnamic acid).

The opposite substrate 2 has second transparent insulating substrate 8 such as a glass substrate or the like, opposite electrode 9 provided on the second transparent insulating substrate 8, and orientation layer 10 coated on the opposite electrode 9.

The pixel electrodes 5 and the opposite electrode 9 are formed of a transparent conductive film such as ITO (Indium-Tin-Oxide) or the like by a sputtering method or the like.

The orientation layer 7 of the pixel substrate 1 and the orientation layer 10 of the opposite substrate 2 are formed of polyimide or the like, and disposed so as to confront each other. Each of the orientation layers 7 and 10 has such a characteristic that liquid crystal molecules 11 are orientated substantially horizontally to the substrates 1, 2, and the liquid crystal layer 3 contains liquid crystal having positive dielectric-constant anisotropy.

Figure 1B:
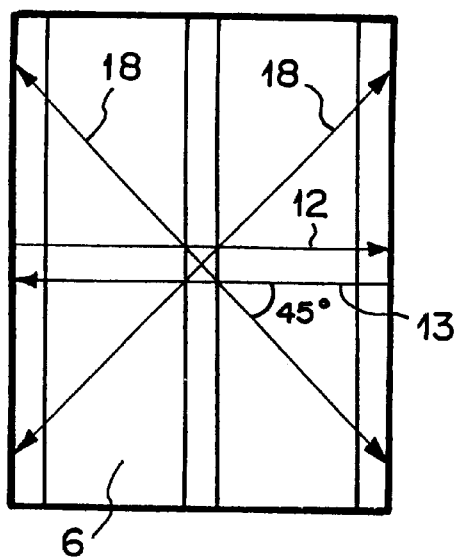
FIG. 1B is a diagram showing the direction of a rubbing treatment which is conducted on orientation layers on a pixel substrate and a opposite substrate.

FIG. 1B is a diagram showing the direction of a rubbing treatment which is conducted on the orientation layers 7 and 10 on the pixel substrate 1 and the opposite substrate 2. As shown in FIG. 1B, the orientation layer 7 of the pixel substrate 1 is subjected to the rubbing treatment in the direction indicated by arrow 12, and the orientation layer 10 of the opposite substrate 2 is subjected to the rubbing treatment in the direction indicated by arrow 13.

The pixel substrate 1 is provided with thin-film transistor (TFT) for driving each pixel electrode 5. A plurality of pixels, each of which is formed between the pixel electrode 5 and the opposite electrode 9, are arranged in a matrix form.

FIG. 8 is a diagram showing the operation of the liquid crystal display device according to the first embodiment.

As shown in FIG. 8, according to the property of the orientation layer 7, the liquid crystal molecules 11 in the neighborhood of the interface have pretilt angle C to the interface. The slope angle of the orientation control slope portion 6 to the substrate 4 is angle B. On the other hand, the liquid crystal molecules 11 in the neighborhood of the orientation layer 10 has pretilt angle A. Giving such orientation control force, the angle of the liquid crystal molecules 11 to the substrate 4 in the neighborhood of the orientation layer 7 is equal to (B−C) in area α and (B+C) in area β. If (B+C) or (B−C) is larger than A, the liquid crystal molecules are oriented to rise up in a direction which is determined by the angle of (B+C) or (B−C) when driving electric field 14 is applied in the direction vertical to the substrate.

For example, when angle A, B and C are equal to 1 degree, 5 degrees and 1 degree respectively, the liquid crystal molecules rise up clockwise with respect to the substrate in the area α and counterclockwise with respect to the substrate in the area β.

When the pretilt angles A and B are small, the liquid crystal molecules in area α' having no slope which is adjacent to the area a and the liquid crystal molecules in areasβ' having no slope which is adjacent to the area β rise up in the same rise-up directions of the areas α and β, respectively.

If the liquid crystal orientation direction (rise-up direction) is different between the areas α and β, the viewing angle characteristic when a viewpoint is inclined is compensated (enhanced) by the respective areas in each pixel, whereby a wide visual field can be obtained.

Through the above operation, domains having different rise-up directions with each pixel are formed, and a liquid crystal display device having a wide rage of viewing angle can be obtained.

According to the liquid crystal display device of this embodiment, the orientation control slope portion 6 is gently slopewise formed in different directions within each pixel, so that the orientation stability of domains is enhanced.

Further, the orientation control slope portion 6 is formed of an organic film, so that the transparency of the device is excellent and a display image can be prevented from being darkened or colored.

The orientation control slope portion 6 of the pixel substrate 1 may be formed in a convex form.

FIGS. 2A to 2F is a cross-sectional view showing a method of manufacturing the liquid crystal display device of the present invention.

First, the pixel electrode 5 (transparent electrode) of ITO or the like is formed on the first transparent insulating substrate 4 by the sputtering method. Subsequently, organic film material (for example, acrylic resin) diluted with organic solvent is coated on the pixel electrode 5 by a spin coating method so as to obtain a film thickness of 3 μm. Thereafter, the organic film material on the substrate is heated and temporarily burned for 1 minute on a hot plate at 100° C. to form the organic film 16.

Figure 2A:
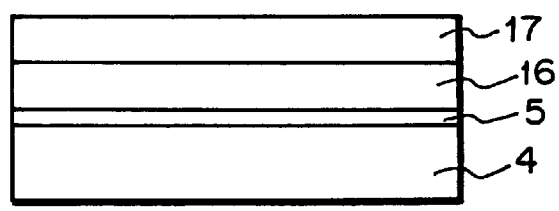
FIGS. 2A to 2F are cross-sectional views showing a series of steps of a manufacturing method of a liquid crystal display according to the present invention.

Subsequently, the photoresist 17 is formed on the organic film 16 by the spin coating method, and heated for 1 minute on the hot plate of 80° C. to temporarily burn the photoresist 17 (see FIG. 2A).

Figure 2B:
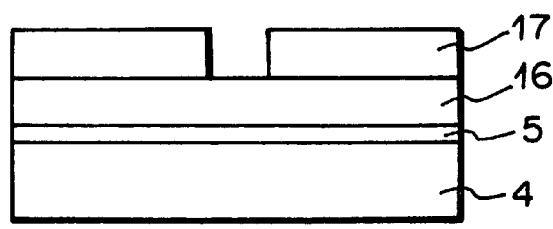
Figure 2C:
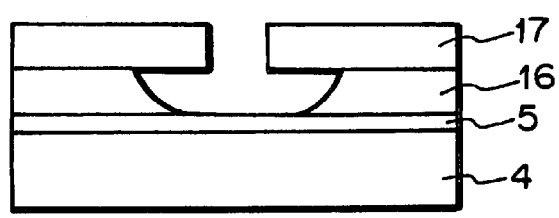

Subsequently, light having energy of about 100 mJ/cm$^2$ is irradiated to the photoresist 17 by a stepper to thereby perform an exposure step (see FIG. 2B).

Next, the first transparent insulating substrate 4 is immersed in alkali developing solution (containing 2.38% of TMAH (tetramethylammonium oxide)) for 140 seconds to perform development. The photoresist 17 used in this step is a positive type resist, and thus a portion of the photoresist to which the light is irradiated is dissolved in the developing solution at a developing step which is the next step. The organic film 16 used in this step has such a property that it is dissolved in the alkali developing solution when it is burned at about 100° C., and thus the organic film 16 is subjected to a wet etching treatment simultaneously with the developing treatment (see FIG. 2C). Since the wet etching treatment is an isotropic etching treatment, a slope face is formed on the etched surface. Therefore, a continuous orientation control slope portion 6 can be formed over a wide range when the orientation control slope portion 6 is formed in a subsequent step, and the orientation direction of the liquid crystal molecules can be effectively controlled.

Subsequently, after the development treatment, post-bake is carried out on the hot plate of 130° C. This step is performed to promote a cross linking reaction of the organic film 16 and enhance the resistance of the organic film 16 to dissolution in an exfoliating liquid in a subsequent resist exfoliating step. Thereafter, light having an energy density of 300 mJ/cm$^2$ is exposed to the whole surface of the substrate. This step is performed to reduce the resistance of the photoresist 17 to exfoliation in the subsequent resist exfoliation step.

Figure 2D:
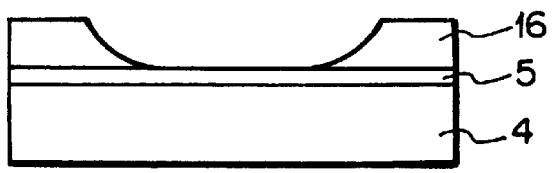

Subsequently, the photoresist 17 is exfoliated by immersing the substrate in the exfoliating liquid for 90 seconds (see FIG. 2D).

Figure 2E:
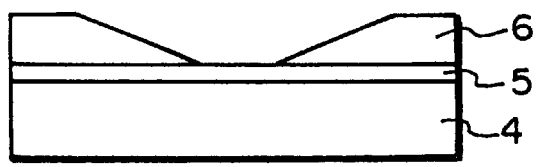

Subsequently, when the substrate is heated under an atmosphere of a higher temperature than the glass transition point of the organic film 16 (200° C.), for example, at 300° C. for 30 minutes by an oven, the shape of the organic film 16 is varied, and a gentle slope surface is formed, whereby orientation control slope portion 6 is formed (see FIG. 2E). By suitably selecting the film forming condition of the organic film 16 and the etching condition, a sufficiently continuous slope surface can be formed over a wide area within about 100 μm from the etching edge. Accordingly, since the pixel size of the normal liquid crystal display device is equal to 200 to 350 μm, most of pixels can be sloped by forming an etching portion in each pixel.

Figure 2F:
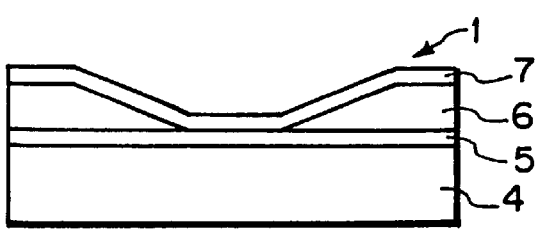

Subsequently, polyimide or the like is coated on the orientation control slope portion 6 and burned to form the orientation layer 7, thereby forming the pixel substrate 1 (see FIG. 2F).

The opposite electrode 9 of ITO or the like is formed on the second transparent insulating substrate 8 as in the case of the pixel substrate 1, and then the orientation layer 10 is formed on the opposite electrode 9 to form the opposite substrate 2.

Subsequently, the orientation layer 7 of the pixel substrate 1 is subjected to the rubbing treatment in the direction indicated by the arrow 12 in FIG. 1B, and the orientation layer 10 of the opposite substrate 2 is subjected to the rubbing treatment in the direction indicated by the arrow 13 in FIG. 1B.

Subsequently, the pixel substrate 1 and the opposite substrate 2 are superposed, and then nematic liquid crystal having positive dielectric-constant anisotropy is injected into the gap between the substrates.

Subsequently, the pixel substrate 1 and the opposite substrate 2 thus superposed are sandwiched by two polarizers whose polarization axes are crossed to each other by 90 degrees and respectively intersect to the rubbing direction at an angle of 45 degrees as indicated by arrows 18 in FIG. 1B.

According to the manufacturing method of the present invention, the organic film 16 which can be designed to have a large thickness is subjected to the wet etching treatment, and then heated to form the orientation control slope portion 6. Therefore, the orientation control slope portion 6 which is gently and widely sloped in different directions within each pixel can be surely achieved.

In the above manufacturing method, the development of the photoresist 17 and the wet-etching treatment of the organic film 16 can be simultaneously performed. However, when material which is not dissolved in alkali developing solution (for example, polyimide, polysilazane, low-temperature curing type polysilazane or benzocyclobutene) is used for the organic film 16, the development of the photoresist 16 and the wet-etching treatment of the organic film 16 may be separately performed.

When polysilazane or low-temperature curing type polysilazane is used as the material of the organic film 16, as compared with general organic materials, the thermal shrinkage is smaller and a more close insulating film can be achieved. As a result, crack due to shrinkage stress at the film formation time does not occur, and a close film can be obtained, so that there can be provided a liquid crystal display device which decreases display defective due to impurities and thus provides high image quality.

Figure 12:
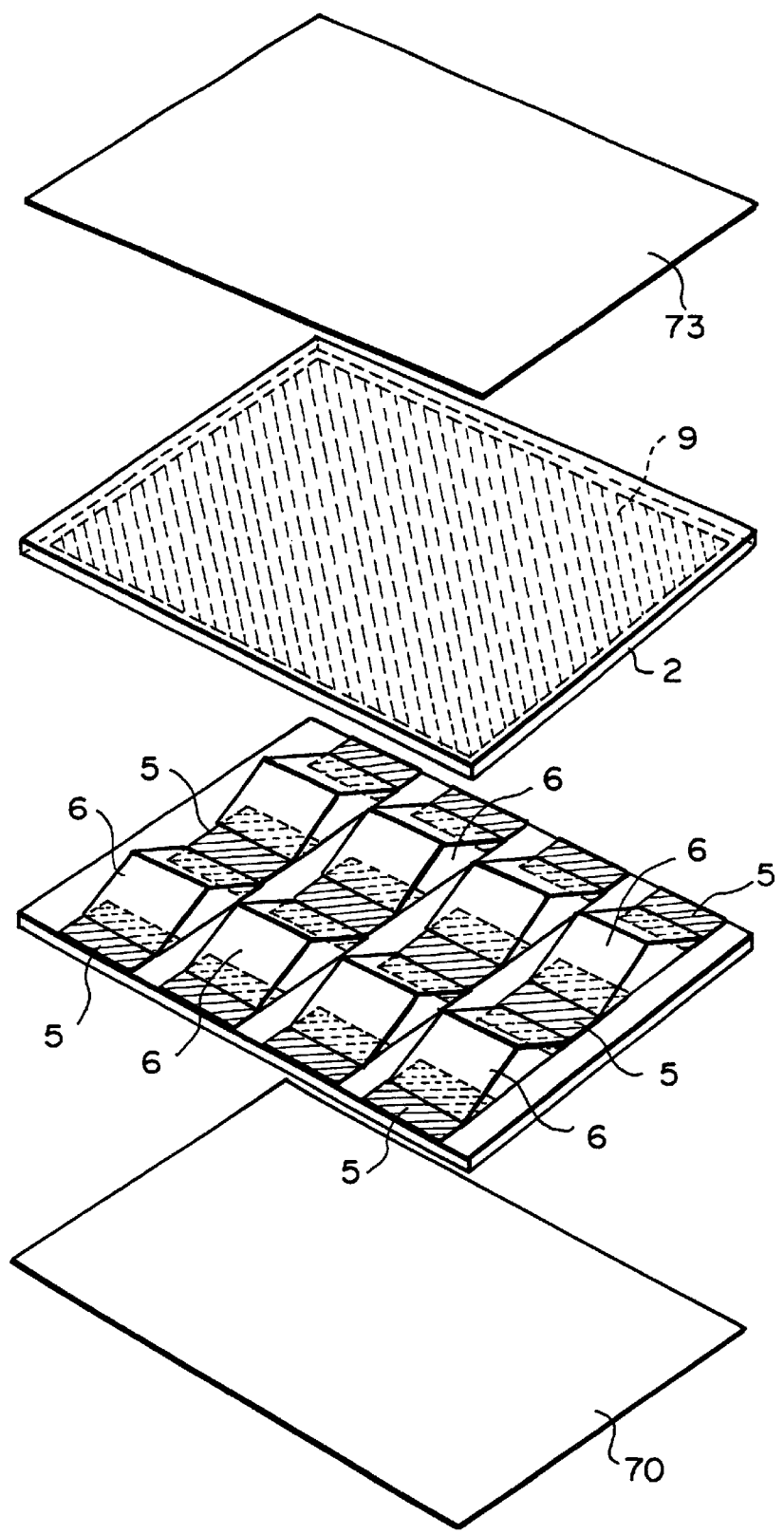
FIG. 12 is an exploded perspective view showing the structure of the liquid crystal display device.

FIG. 12 is an exploded perspective view showing the structure of the liquid crystal display device. As shown FIG. 12, orientation control slope portion 6 of the pixel substrate 1 is formed to extend over two pixel electrodes 5, and two orientation control slope portions 6 are partially disposed on pixel electrode 5 of each pixel.

Consequently, the two orientation control slope portions 6 make up a concave form in each pixel so as to be gently sloping in different directions in each pixel. The pixel substrate 1 and the opposite substrate 2 are sandwiched between polarizers 70 and 73. The opposite electrode 9 is a common electrode faced to all pixel electrodes 5.

Figure 13:
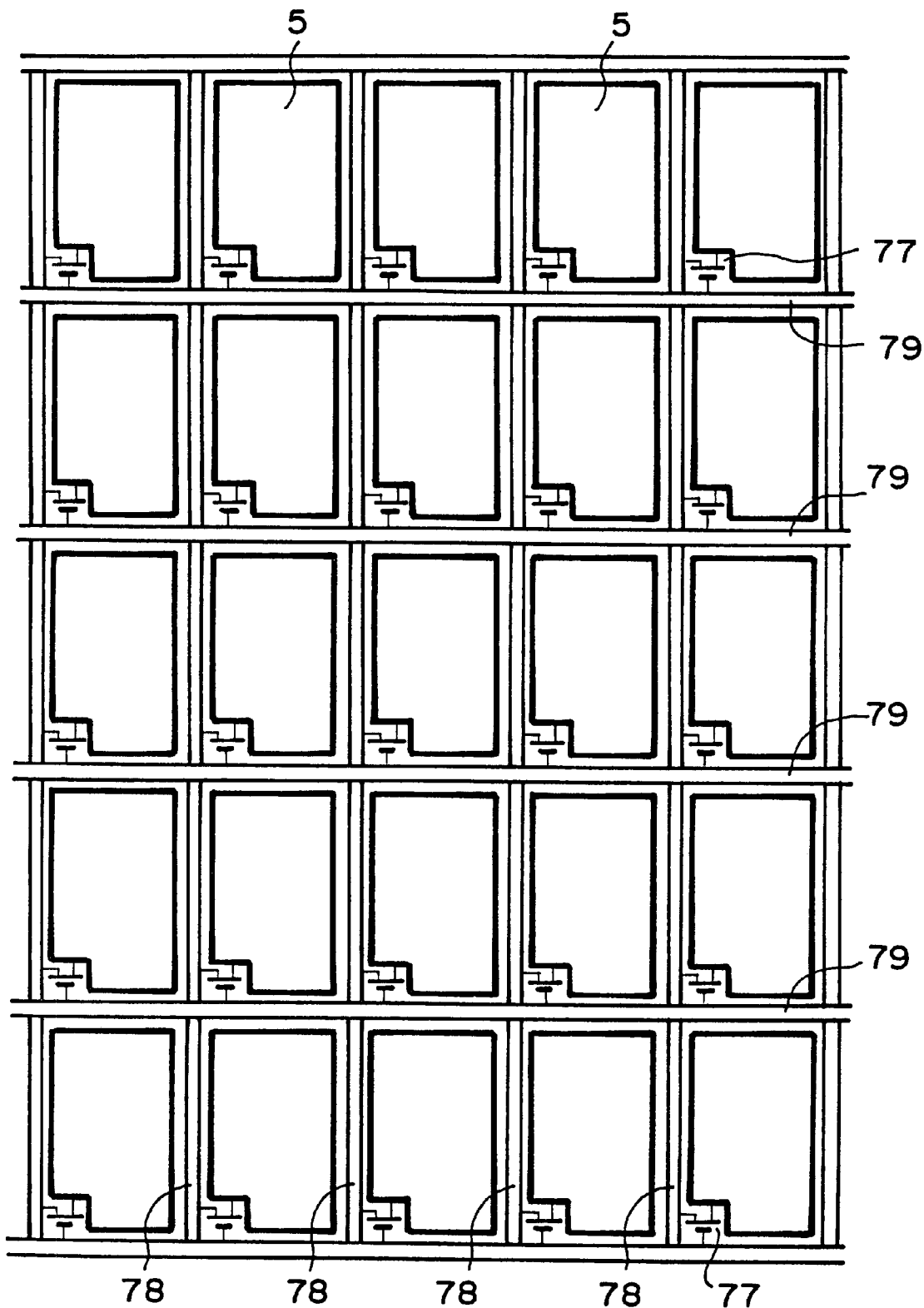
FIG. 13 is a plane view showing the structure of the pixel substrate.

FIG. 13 is a plane view showing the structure of the pixel substrate 1. As shown FIG. 13, pixel electrode 5 and TFT 77 are formed within a pixel. The pixel electrode 5 in each pixel is connected with signal electrode line 78 through TFT 77. The gate of TFT 77 is connected with scanning electrode line 79.

In FIG. 12, TFT 77, signal electrode line 78 and scanning electrode line 79 are omitted.

Figure 19:
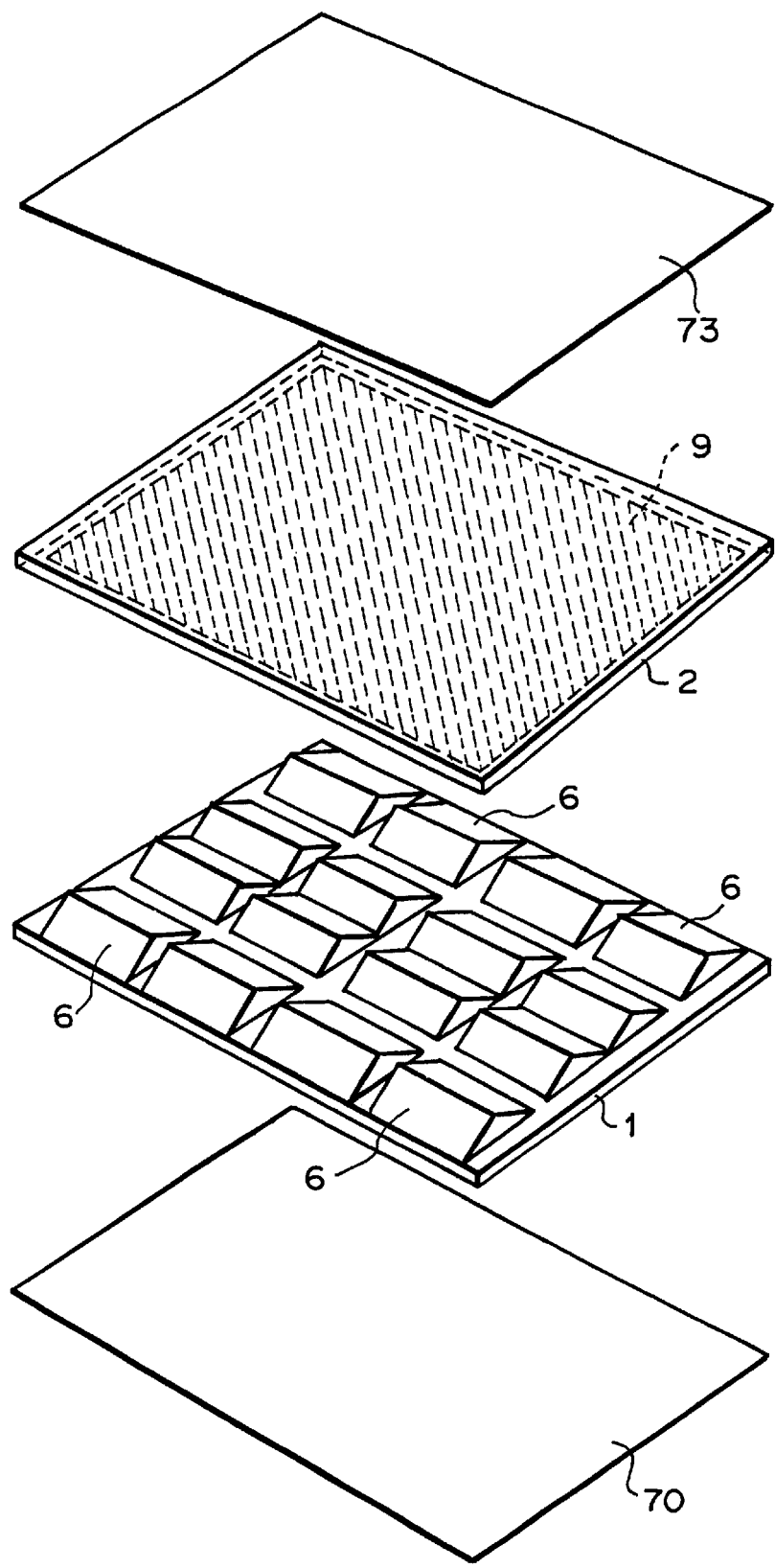
FIG. 19 is an exploded perspective view showing the structure of the liquid crystal display device which two or more orientation control slope portions are formed to within a pixel.

As shown FIG. 19, two orientation control slope portions 6 may be formed to within a pixel. In FIG. 19, TFT 77, signal electrode line 78, scanning electrode line 79 and pixel electrode 5 are omitted. More than two orientation control slope portions 6 may be formed to within a pixel.

FIG. 3 is a cross-sectional view showing a liquid crystal display device according to a second embodiment of the present invention.

In the second embodiment, the orientation layer 7 has such a property that the liquid crystal molecules 11 are oriented substantially vertically to the substrate 4, and the liquid crystal of the liquid crystal layer 3 has negative dielectric-constant anisotropy. The other structure of the pixel substrate 1 and the opposite substrate 2 and the manufacturing method are similar to those of the first embodiment.

The pixel substrate 1 and the opposite substrate 2 are sandwiched between two polarizers whose polarization axes are crossed to each other by 90 degrees so as to intersect to the inclination direction of the liquid crystal molecules 11 by 45 degrees.

FIG. 9 is a diagram showing the operation of the liquid crystal display device according to the second embodiment of the present invention.

In FIG. 9, according to the property of the orientation layer 7, the liquid crystal molecules 11 in the neighborhood of the interface are inclined to the interface by 90 degrees. Here, the inclination angle of the orientation control slope portion 6 to the substrate 4 is set to angle B. Giving these orientation control force, the inclination angle of the liquid crystal molecules 11 to the substrate 4 in neighborhood of the pixel substrate 1 is equal to (90+B) in an area α and (90−B) in an area β. Since the dielectric-constant anisotropy of the liquid crystal is negative, the liquid crystal molecules 11 is inclined in a direction which is regulated by the angle (90+B) or (90−B) when a voltage is applied. As a result, areas having different liquid crystal orientation directions (inclination directions) occur in each pixel, and the viewing angle characteristic when the viewpoint is inclined is compensated between the respective areas in each pixel, thereby obtaining a wide visual field characteristic.

According to the second embodiment, the inclination direction of the liquid crystal is regulated by the orientation control slope portion 6, so that no rubbing treatment is necessary and thus the number of the manufacturing steps can be reduced.

Figure 4A:
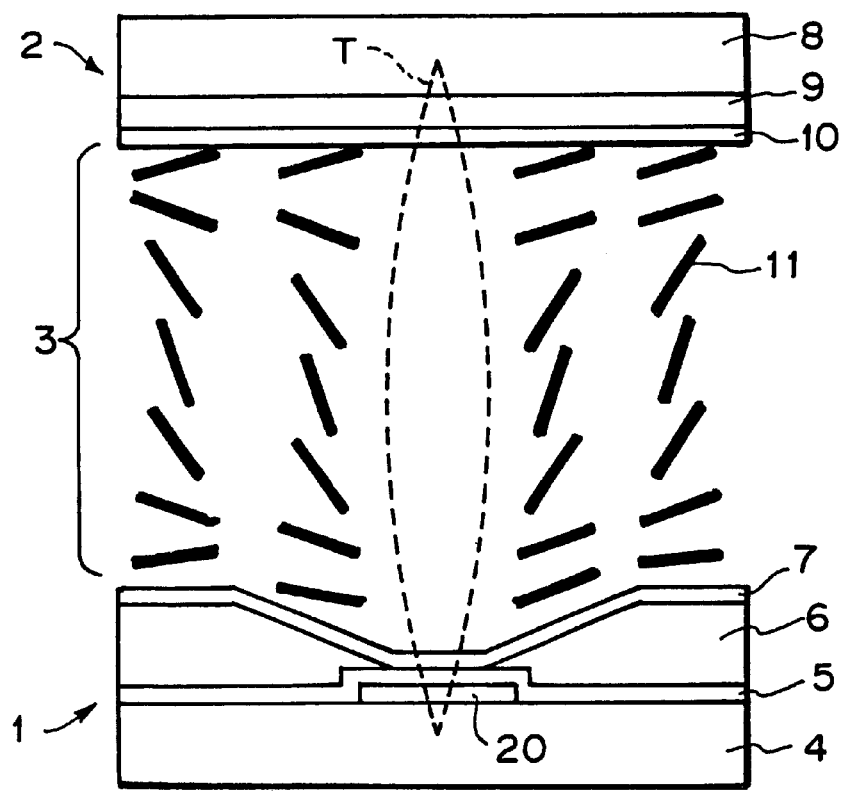
FIG. 4A is a cross-sectional view showing a liquid crystal display device according to a third embodiment of the present invention.
Figure 4B:
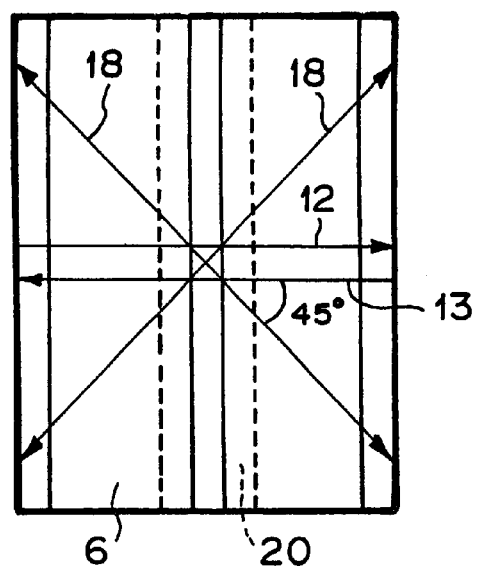
FIG. 4B is a diagram showing the direction of a rubbing treatment which is conducted on orientation layers on a pixel substrate and a opposite substrate.

FIG. 4A is a cross-sectional view showing a liquid crystal display device according to a third embodiment of the present invention, and FIG. 4B is a diagram showing the direction of the rubbing treatment to be subjected to the orientation layers 7, 10 on the pixel substrate 1 and opposite substrate 2.

In the third embodiment, an opaque shielding electrode 20 is disposed on a first transparent insulating substrate 4 at a portion where the orientation direction (rise-up direction) of the liquid crystal molecules 11 is varied. Further, the pixel electrode 5 is provided on the shielding electrode 20 so as to be electrically connected to the shielding electrode 20. The other structure of the pixel substrate 1, the opposite substrate 2 and the liquid crystal layer 3 and the manufacturing method are similar to the first embodiment.

In general, in the liquid crystal molecules 11, defective (hereinafter referred to as "dislocation") occurs at a portion where the molecular orientation is discontinuously changed, and it is observed as light leakage at a black display time. When such dislocation occurs, the contrast is reduced and thus no high-quality display is obtained.

However, according to the third embodiment, the portion at which the dislocation occurs and the rise-up direction is varied (represented by T in FIG. 4A) can be shielded by the opaque shielding electrode 20, so that the contrast is not reduced and thus higher image quality can be obtained.

Figure 5:
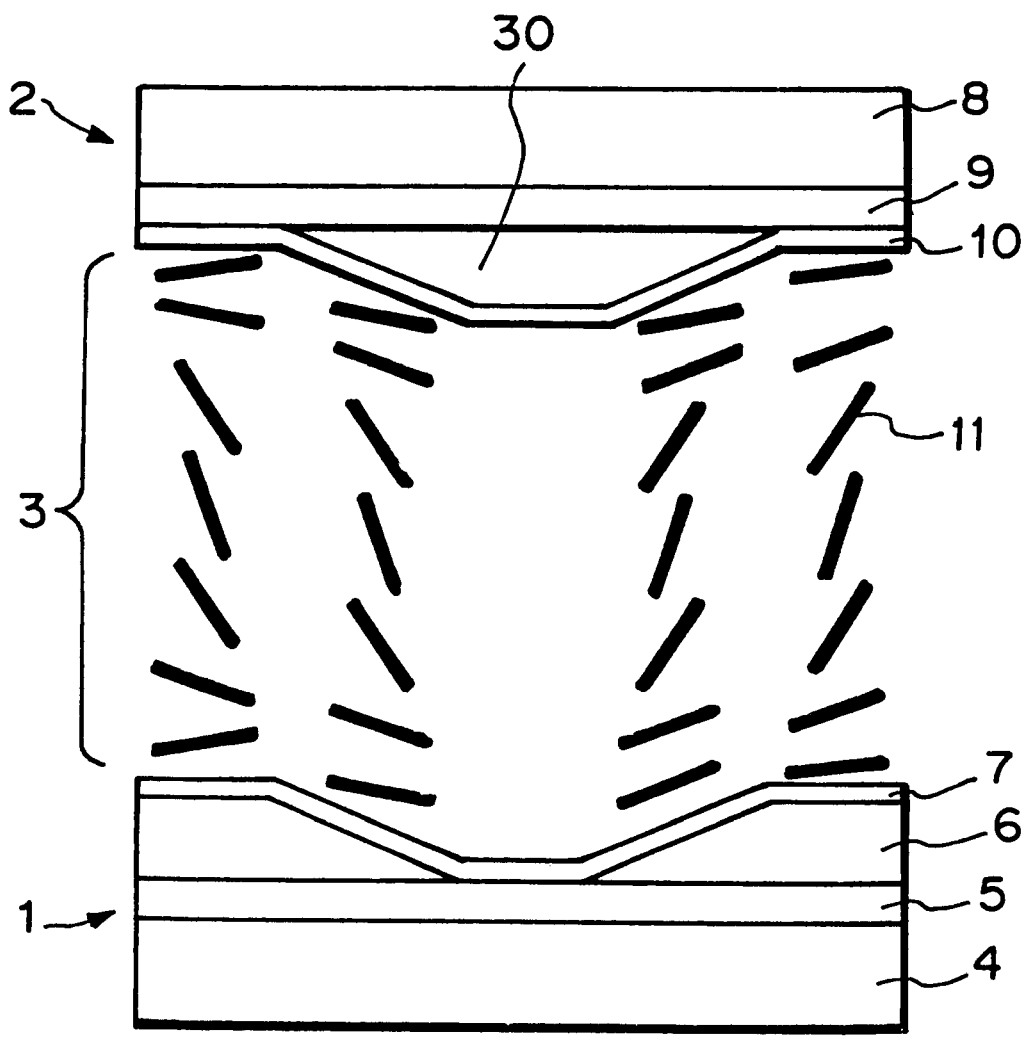
FIG. 5 is a cross-sectional view showing a liquid crystal display device according to a fourth embodiment of the present invention.

FIG. 5 is a cross-sectional view showing a liquid crystal display device according to a fourth embodiment of the present invention.

In the fourth embodiment, an orientation control slope portion 30 is provided on the opposite electrode 9 of the opposite substrate 2. The slope surface of the orientation control slope portion 30 of the opposite substrate 2 is formed to be substantially parallel to the slope surface of the orientation control slope portion 6 of the pixel substrate 1. That is, the orientation control slope portion 6 of the pixel substrate 1 is formed in a recess (concave) form, and the orientation control slope portion 30 of the opposite substrate 2 is formed in a convex form. The orientation control slope portion 6 of the pixel substrate 1 may be formed in a convex form while the orientation control slope portion 30 of the opposite substrate 2 is formed in a concave form. The orientation layer 10 is provided on the orientation control slope portion 30 of the opposite substrate 2.

The pixel substrate 1 and the opposite substrate 2 are disposed so that the orientation layers 7 and 10 are confronted to each other, and the liquid crystal layer 3 is disposed between the orientation layers 7 and 10.

The orientation layers 7, 10 used in the fourth embodiment have such a property that the liquid crystal molecules 11 are oriented substantially parallel to the substrate, and the liquid crystal of the liquid crystal layer 3 has positive dielectric-constant anisotropy.

The pixel substrate 1 and the opposite substrate 2 are sandwiched by two polarizers whose polarization axes are crossed to each other by 90 degrees so as to intersect to the inclination direction of the liquid crystal molecules 11 at an angle of 45 degrees.

FIGS. 6A to 6F are cross-sectional views showing a method of manufacturing the liquid crystal display device according to the fourth embodiment of the present invention. FIG. 2 shows the method of manufacturing the pixel substrate on which the orientation control slope portion 6 is designed in a concave shape, however, FIG. 6 shows the method of manufacturing the opposite substrate 2 on which the orientation control slope portion 30 is designed in a convex shape. The various conditions such as temperature are the same as the manufacturing method shown in FIG. 2.

First, the opposite electrode 9 (transparent electrode) such as ITO or the like is formed on the second transparent insulating substrate 8 by the sputtering method.

Subsequently, organic film material (for example, acrylic resin) diluted with organic solvent is coated on the opposite electrode 9 by the spin coating method. Thereafter, it is heated and temporarily burned on a hot plate to form the organic film 16.

Figure 6A:
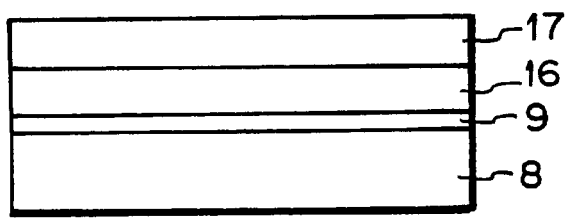
FIGS. 6A to 6F are cross-sectional views showing a series of steps of a manufacturing method of the liquid crystal display device of the fourth embodiment.

Subsequently, the photoresist 17 is formed on the organic film 16 by the spin coating method, and heated and temporarily burned on the hot plate (see FIG. 6A).

Figure 6B:
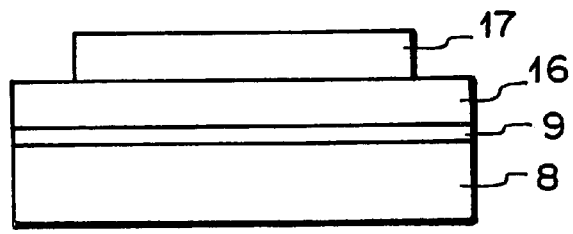
Figure 6C:
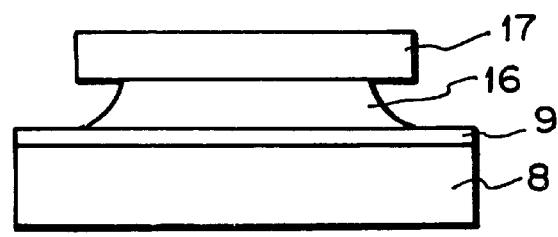

Subsequently, light is irradiated to the photoresist 17 by using a stepper to complete an exposure step (see FIG. 6B). At this time, both the end portions of each pixel are exposed to light.

Subsequently, the second transparent insulating substrate 8 is immersed in alkali developing solution to be developed. Since the photoresist 17 used in this step is positive type resist, a part of the resist which is exposed to light will be dissolved in the developing solution in the subsequent developing step. The organic film 16 used in this step is inherently dissolved in the alkali developing solution, and thus the wet-etching treatment of the organic film 16 is carried out simultaneously with the developing step (see FIG. 6C). The wet-etching treatment is an isotropic etching treatment, and thus a slope face is formed on the etched surface. Therefore, a continuous orientation control slope portion 30 can be formed in a wide range when the orientation control slope portion 30 is formed in the subsequent step, so that the orientation direction of the liquid crystal can be effectively controlled.

Subsequently, after the developing treatment, the post-bake treatment is carried out on the hot plate. This step is carried out to promote the cross linking reaction and enhance the resistance of the organic film 16 to dissolution in the exfoliating liquid in the subsequent resist exfoliating step. Thereafter, the whole surface of the substrate is exposed to light. This step is carried out to reduce the resistance of the photoresist 17 to exfoliation in the subsequent resist exfoliating step.

Figure 6D:
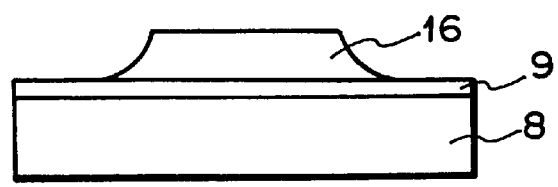

Subsequently, the photoresist 17 is exfoliated by immersing it into the exfoliating liquid (see FIG. 6D).

Figure 6E:
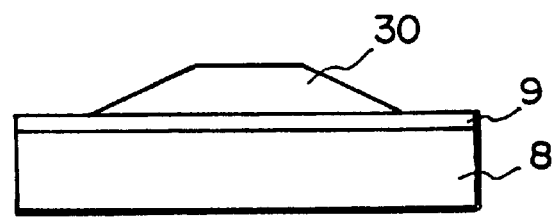

Subsequently, upon heating by an oven, the organic film 16 is deformed, and the orientation control slope portion 30 having a gentle slope surface is formed (see FIG. 6E). A sufficiently continuous slope surface can be formed by suitably selecting a film forming condition of the organic film 16 and an etching condition.

Figure 6F:
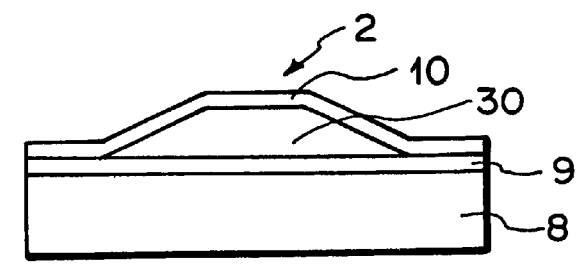

Thereafter, polyimide or the like is coated on the orientation control slope portion 30 and burned to form the orientation layer 10, thereby obtaining the opposite substrate 2 (see FIG. 6F).

Figure 7:
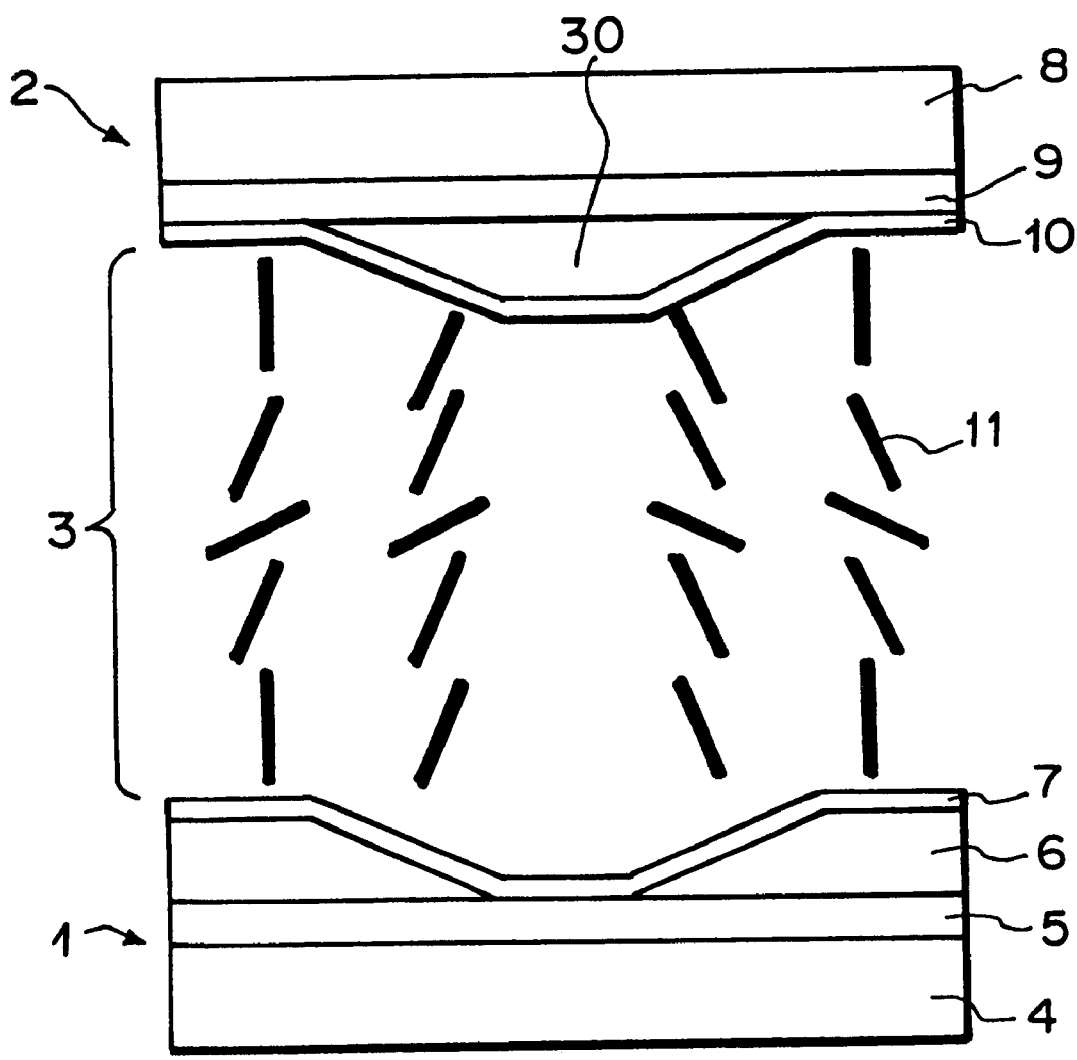
FIG. 7 is a cross-sectional view showing a liquid crystal display device according to a fifth embodiment of the present invention.
Figure 10:
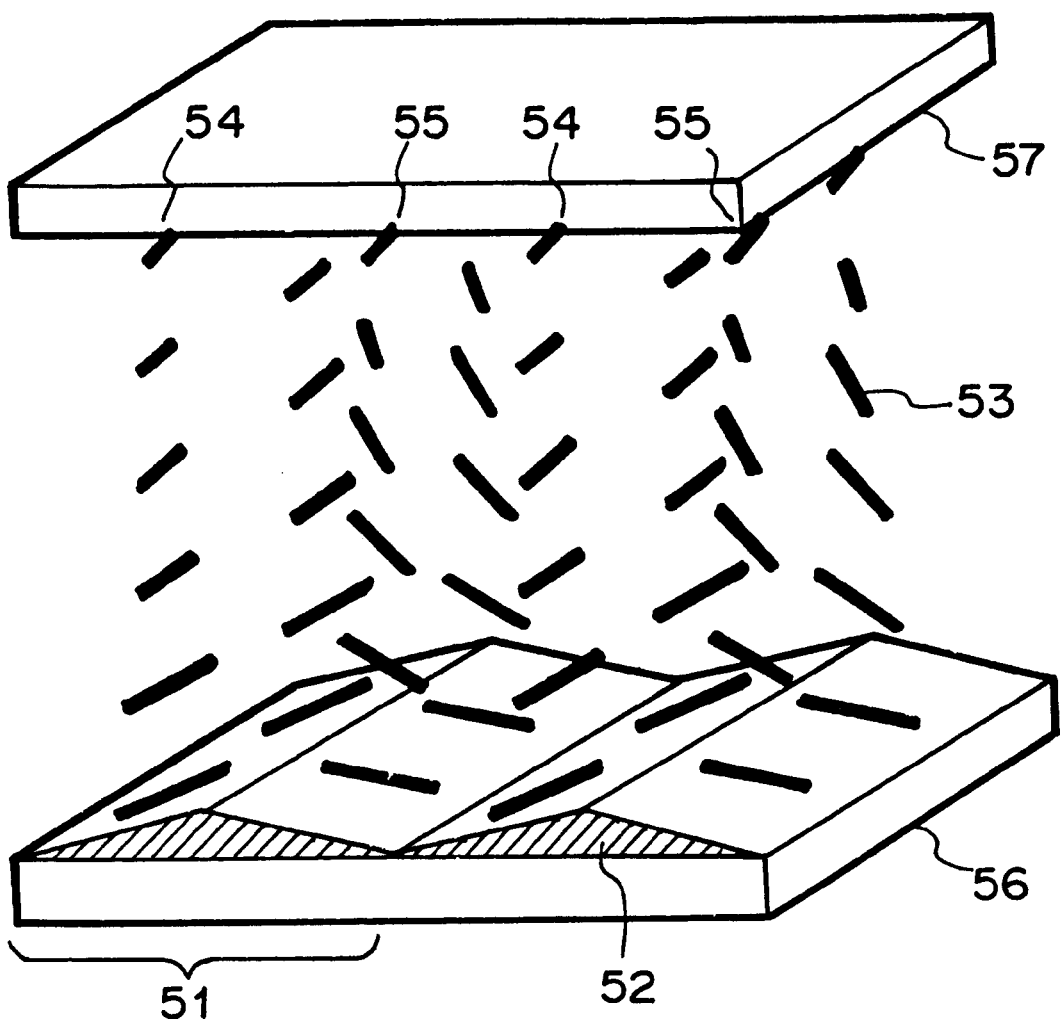
FIG. 10 is a perspective view showing a conventional liquid crystal display device.
Figure 11A:
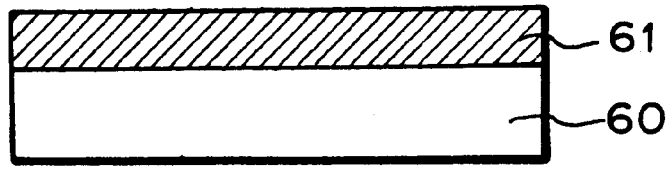
FIGS. 11A to 11D are cross-sectional views showing a series of steps of a method of manufacturing a substrate used in the conventional liquid crystal display device.
Figure 11B:
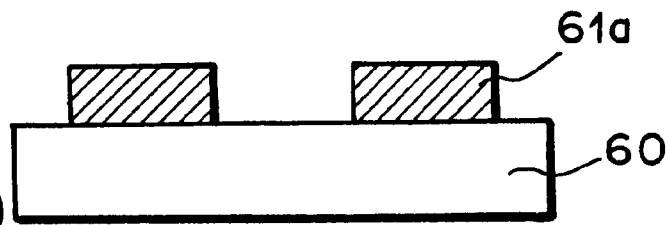
Figure 11C:
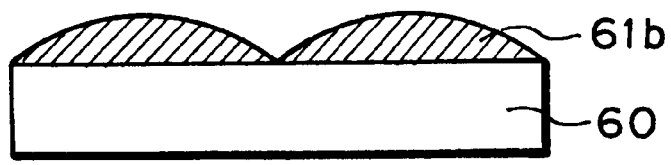
Figure 11D:
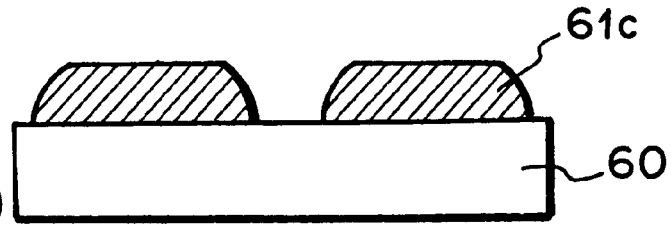

FIG. 7 is a cross-sectional view showing a liquid crystal display device according to a fifth embodiment of the present invention.

In the fifth embodiment, the orientation layer 7 has such a property that the liquid crystal molecules 11 are oriented substantially vertically to the substrate, and the liquid crystal of the liquid crystal layer 3 has negative dielectric-constant anisotropy. The other structure of the pixel substrate 1 and the opposite substrate 2 and the manufacturing method are similar to the fourth embodiment.

The pixel substrate 1 and the opposite substrate 2 are sandwiched by two polarizers whose polarization axes are crossed to each other by 90 degrees so as to intersect to the inclination direction of the liquid crystal molecules 11 by 45 degrees.

According to the fourth and fifth embodiments, the orientation control slope portion 30 is provided to not only the pixel substrate 1, but also the opposite substrate 2, and the pixel substrate 1 and the opposite substrate 2 are disposed so that the confronting surfaces of the orientation control slope portions 6 and 30 thereof are parallel to each other. Therefore, the tilt angle of the liquid crystal in the bulk of the liquid crystal layer 3 can be stabilized. As a result, the rise-up direction of the liquid crystal is stabilized, and the orientation stability of the domains is enhanced.

Figure 14:
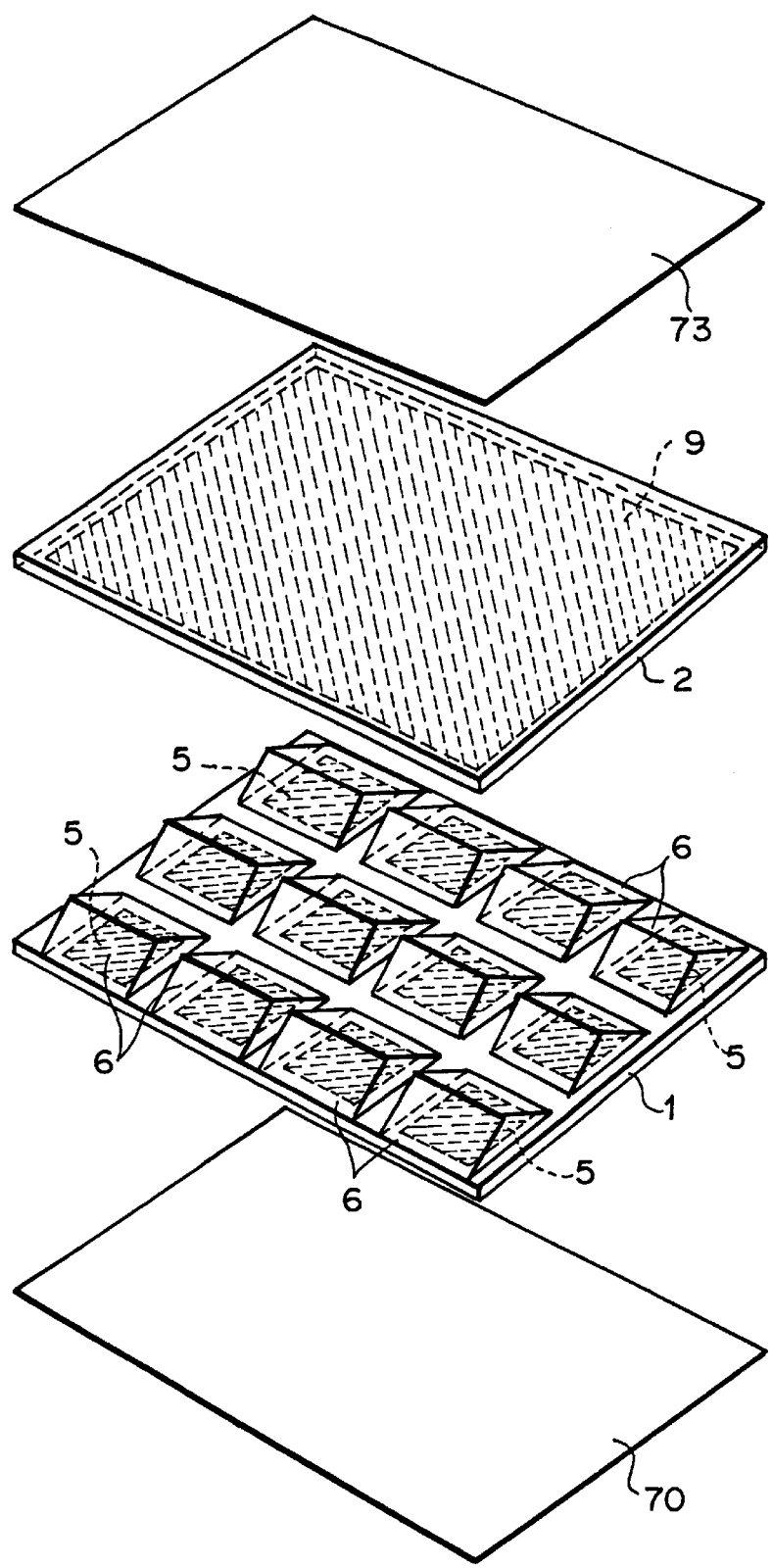
FIG. 14 is an exploded perspective view showing a liquid crystal display device according to a sixth embodiment of the present invention.

FIG. 14 is an exploded perspective view showing a liquid crystal display device according to a sixth embodiment of the present invention. As shown FIG. 14, one orientation control slope portion 6 is formed to cover one pixel electrode 5 in each pixel. Consequently, the orientation control slope portion 6 makes up a convex form in each pixel so as to be gently sloping in different directions in each pixel. In FIG. 14, the orientation control slope portion 6 covers only pixel electrode 5. The orientation control slope portion 6 may cover the pixel electrode 5 and TFT 77 or the whole of a pixel.

Figure 15:
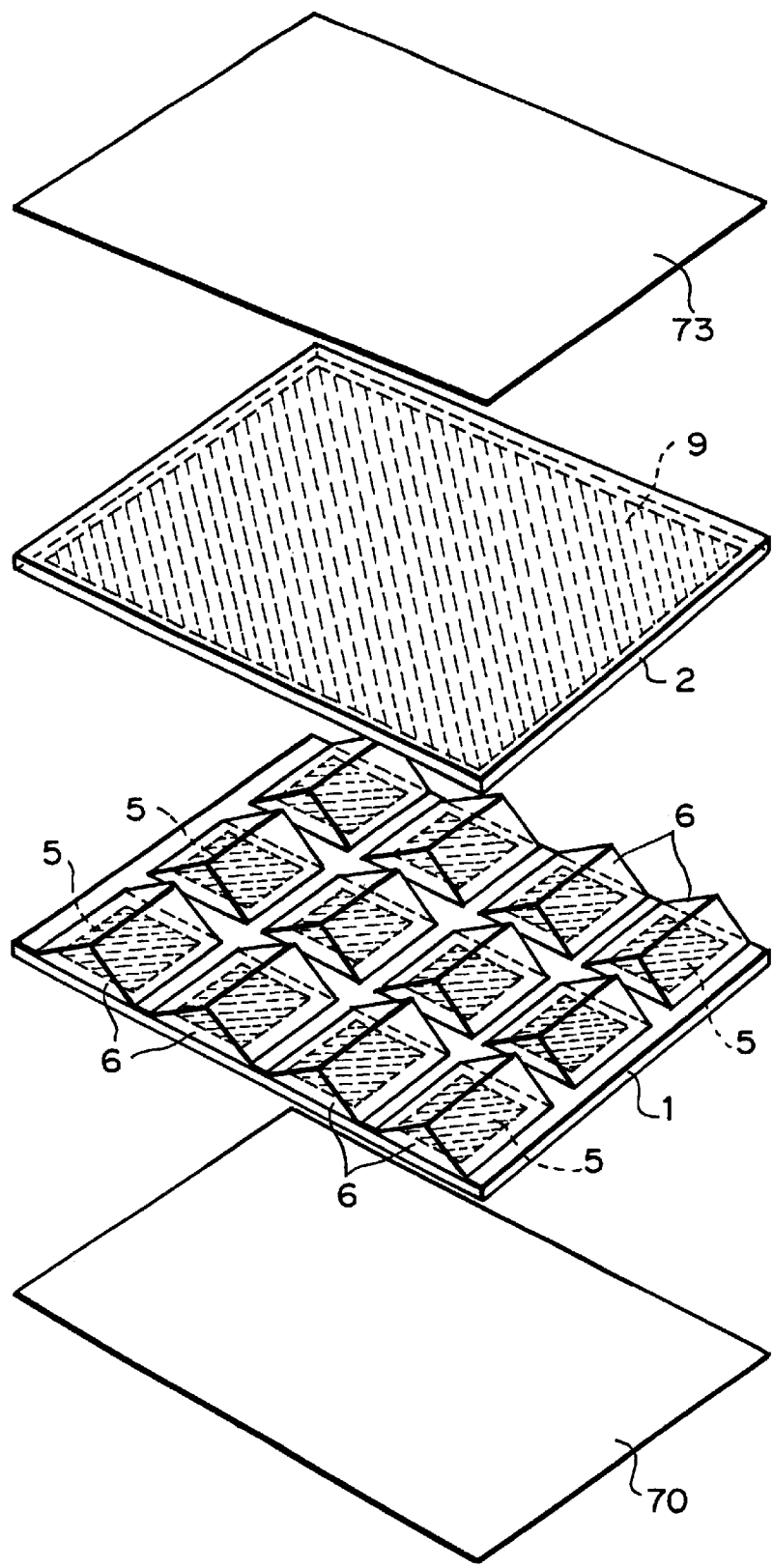
FIG. 15 is an exploded perspective view showing a liquid crystal display device according to a seventh embodiment of the present invention.

FIG. 15 is an exploded perspective view showing a liquid crystal display device according to a seventh embodiment of the present invention. As shown FIG. 15, the orientation control slope portion 6 of this embodiment is arranged to turn the orientation control slope portion 6 of FIG. 14 at 90°. The slope of the orientation control slope portion 6 may be arranged in any direction.

The above embodiments of the present invention are used for the liquid crystal display device of the TFT form. This invention may be applied to the liquid crystal display device of simple matrix form in which liquid crystal such as STN (Super Twisted Nematic) is used.

The following will explain about the embodiment.

Figure 16:
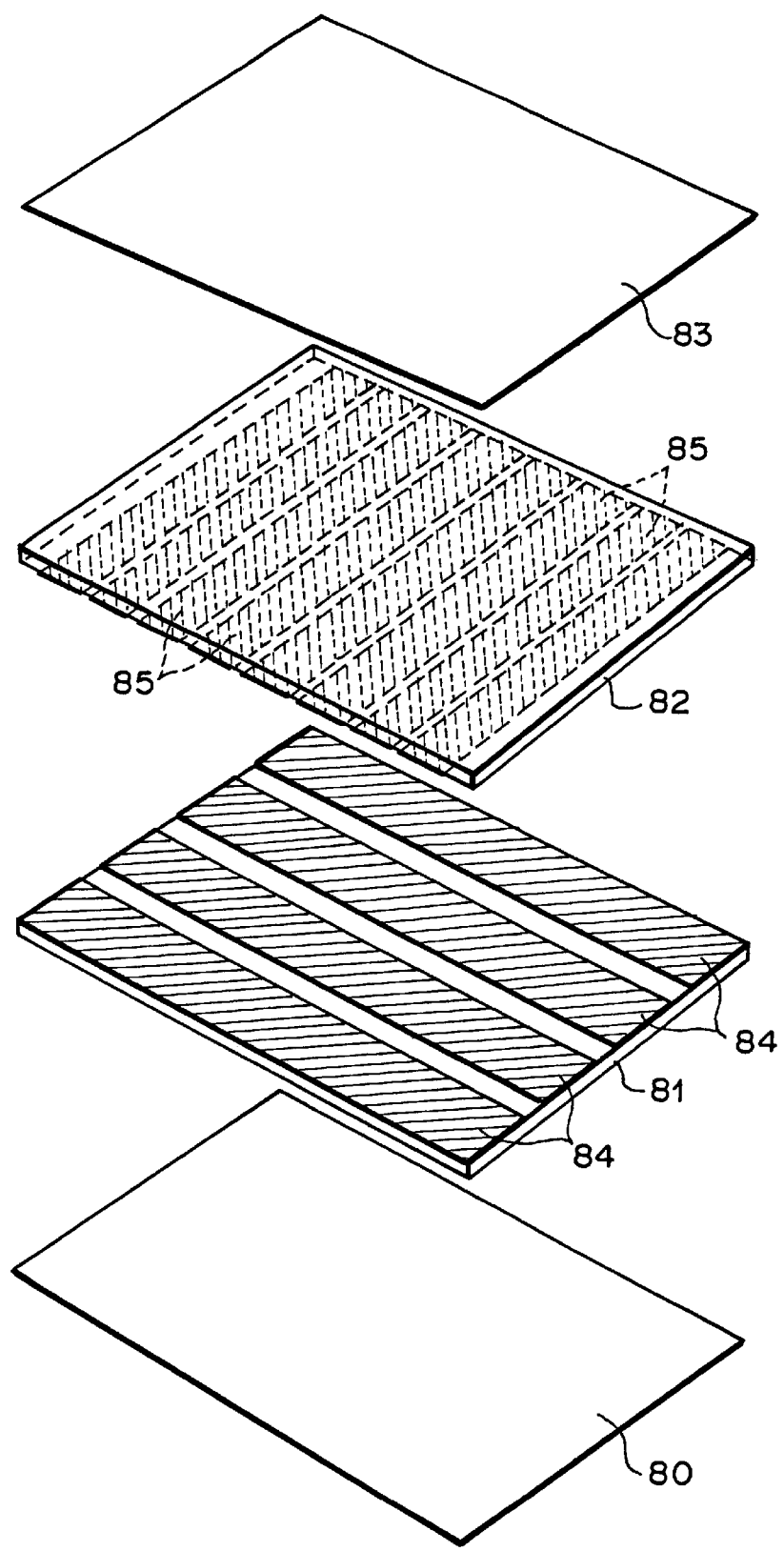
FIG. 16 is an exploded perspective view showing a liquid crystal display device according to a eighth embodiment of the present invention.

FIG. 16 is an exploded perspective view showing a liquid crystal display device according to a eighth embodiment of the present invention. In FIG. 16, the orientation control slope portions 6 are omitted.

Figure 17:
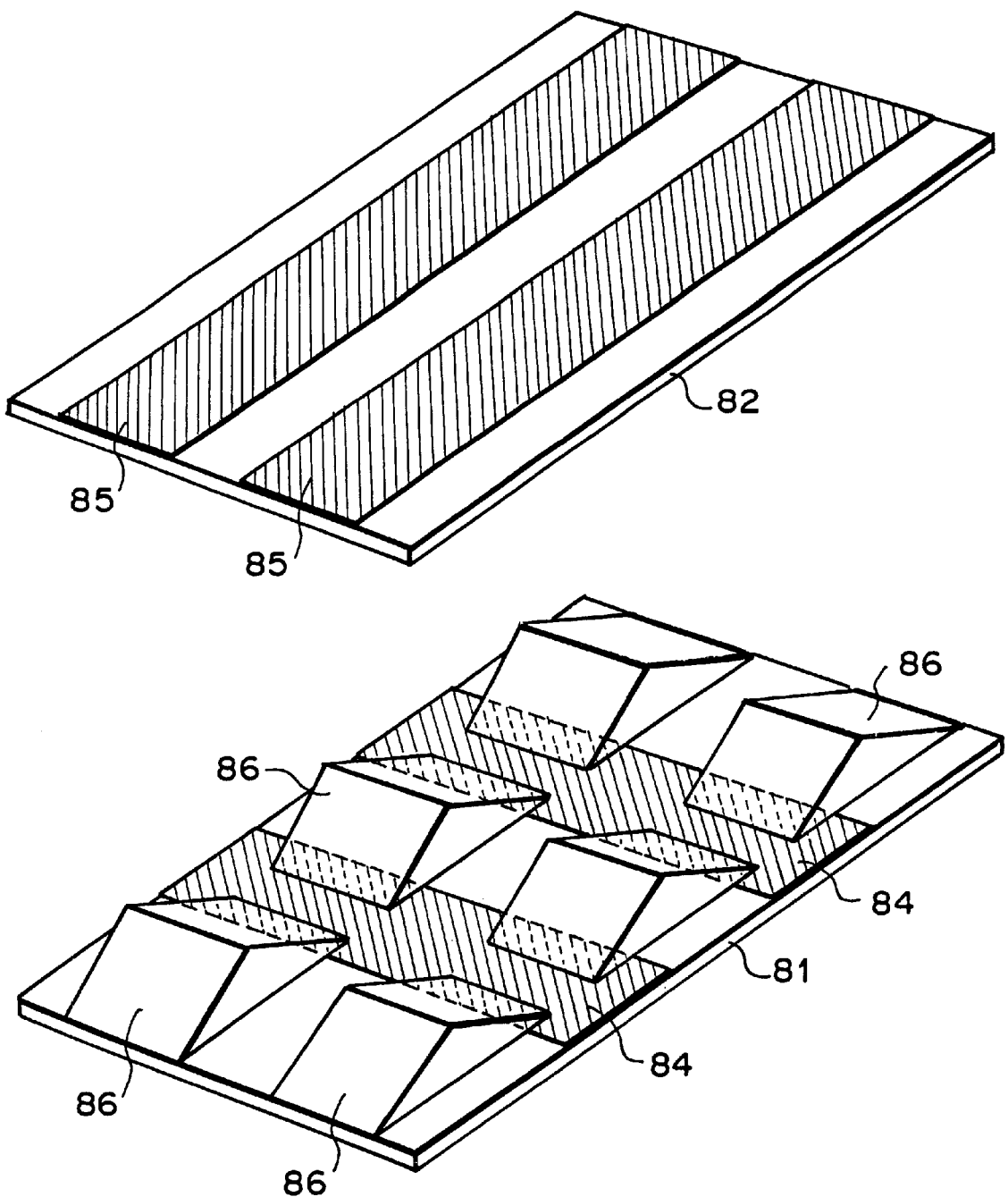

FIGS. 17 and 18 are fragmentary exploded perspective views showing the pixel substrate and opposite substrate of the eighth embodiment. The structure of FIG. 17 corresponds to the first embodiment of FIG. 12, and the structure of FIG. 18 corresponds to the sixth embodiment of FIG. 14. In FIG. 17, orientation control slope portions 86 is formed to extend over two pixel electrodes 84. In FIG. 18, orientation control slope portion 86 is formed to cover a width direction part of pixel electrode 5.

As shown FIG. 16, the pixel substrate 81 and the opposite substrate 82 are sandwiched between polarizers 80 and 83. As shown FIG. 16, pixel electrodes 84 and opposite electrodes 85 are respectively composed of the electrodes arranged in parallel, and the part where one line of pixel electrodes 84 and one line of opposite electrodes 85 cross each other becomes a pixel.

The present invention is not limited to the above embodiments, and various modifications may be made without departing from the subject matter of the present invention.

According to the liquid crystal display device of the present invention, the orientation control slope portion is gently slopewise formed in different directions within each pixel, so that the orientation stability of the domains is enhanced.

Further, the orientation control slope portion is formed of an organic film, so that the transparency is enhanced and the display image can be prevented from being darkened or colored.

According to the manufacturing method of the present invention, the organic film which can be designed to have a large thickness is wet-etched and then heated to form the orientation control slope portion. Therefore, the orientation control slope portion that is gently and widely sloped in different directions within each pixel can be surely achieved.

What is claimed is:

1. A method of manufacturing a liquid crystal display device comprising the steps of:
   (1) coating an organic material on one or more electrodes of at least one of a pair of substrates to form an organic film;
   (2) coating photoresist on the organic film;
   (3) exposing the photoresist to light;
   (4) immersing the substrate in developing solution to perform development and subjecting the organic film to wet etching with the developing solution;
   (5) exfoliating the photoresist;
   (6) deforming the organic film by heating the organic film, and providing on the substrate orientation control slope portions which are sloping in different directions respectively and formed of organic film; and
   (7) coating an orientation film on the orientation control slope portions.

2. The manufacturing method as claimed in claim 1, wherein the developing solution is an alkali developing solution, and the organic film is composed of material which is dissolved in the alkali developing solution.

3. A method of manufacturing a liquid crystal display device comprising the steps of:
   (1) coating an organic material on one or more electrodes of at least one of a pair of substrates to form an organic film;
   (2) coating photoresist on the organic film;
   (3) exposing the photoresist to light;
   (4) immersing the substrate in developing solution to perform development;
   (5) wet-etching the organic film;
   (6) exfoliating the photoresist;
   (7) deforming the organic film by heating the organic film, and providing on the substrate orientation control slope portions which are sloping in different directions respectively and formed of organic film; and
   (8) coating an orientation film on the orientation control slope portions.

4. The manufacturing method as claimed in claim 3, wherein the developing solution is an alkali developing solution, and the organic film is composed of material which is not dissolved in the alkali developing solution.

* * * * *

UNITED STATES PATENT AND TRADEMARK OFFICE
CERTIFICATE OF CORRECTION

PATENT NO.     : 6,570,635 B2
DATED          : May 27, 2003
INVENTOR(S)    : Hironori Kikkawa It is certified that error appears in the above-identified patent and that said Letters Patent is hereby corrected as shown below:

<u>Title page,</u>
Item [62], the Patent Number should read as -- 6,476,894 -- instead of "6,647,894".

Signed and Sealed this

Thirtieth Day of September, 2003

JAMES E. ROGAN
*Director of the United States Patent and Trademark Office*